March 10, 1925.
O. WILCKE
TESTING DEVICE FOR ELECTRIC CIRCUITS
Filed June 28, 1920
1,528,865
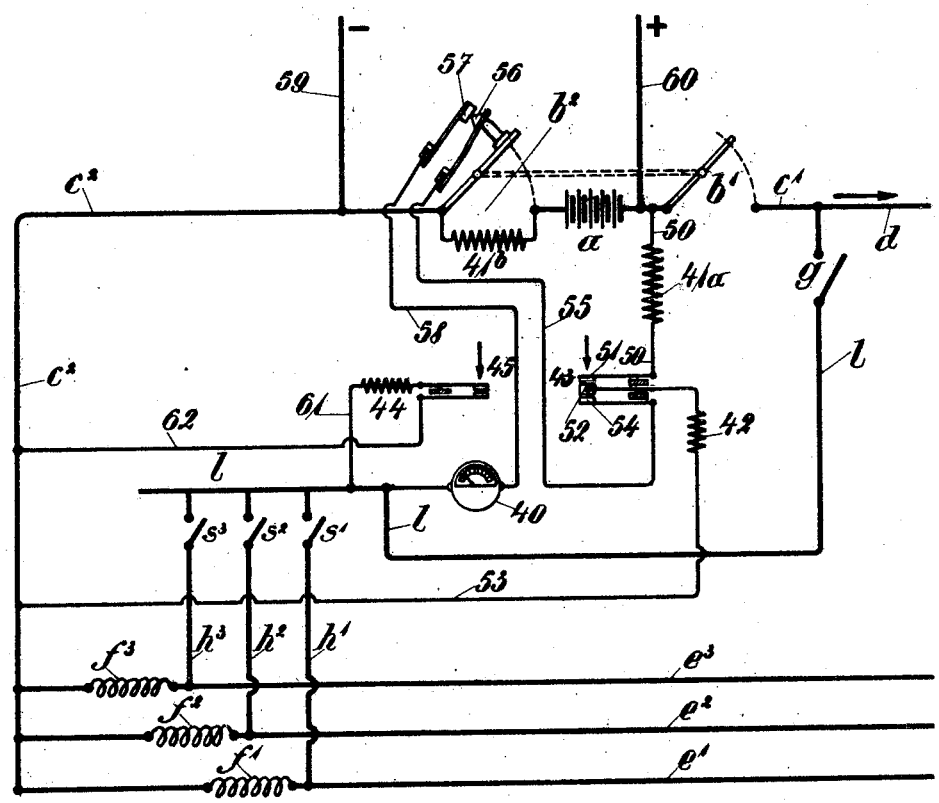
INVENTOR:

Patented Mar. 10, 1925.

1,528,865

UNITED STATES PATENT OFFICE.

OSCAR WILCKE, OF FRIEDRICHSHAFEN, GERMANY, ASSIGNOR TO THE FIRM LUFT-SCHIFFBAU ZEPPELIN GESELLSCHAFT MIT BESCHRANKTER HAFTUNG, OF FRIEDRICHSHAFEN, GERMANY.

TESTING DEVICE FOR ELECTRIC CIRCUITS.

Application filed June 28, 1920. Serial No. 392,575.

(GRANTED UNDER THE PROVISIONS OF THE ACT OF MARCH 3, 1921, 41 STAT. L., 1313.)

*To all whom it may concern:*

Be it known that I, OSCAR WILCKE, a citizen of the German Empire, residing at Friedrichshafen, Germany, have invented certain new and useful Improvements in Testing Devices for Electric Circuits (for which I have filed application in Germany, February 2, 1916, Patent No. 316584), of which the following is a specification.

My invention refers to a testing device for electric circuits and more especially the circuits of bomb throwing installations controlled by electromagnets. Its particular object is an appliance for testing the circuits of the individual electro-magnetic coils in such a manner as to prevent short-circuit, as this endangers the accurate action of the machinery as well as it may, in airships, cause the ignition of the gas.

For this purpose, as customary in measuring appliances, the circuit branched off the main circuit and serving to supply the measuring instrument is provided with a very high series resistance. In order to supply the measuring instrument, (a milliammeter, arranged in series with the circuit to be tested) with a sufficiently low tension this instrument is connected in parallel to a very small part of this resistance, so that it measures only a very low drop of voltage. According to the present invention the switching appliance is designed so that the measuring instrument can be switched in only when the main switch is opened and the circuit containing the measuring resistance closed.

In the main circuit the danger of short-circuit is effectually removed by using a double pole main switch. Thereby the disadvantage is avoided that a long arm of the main circuit is permanently connected with the source of current and that, when the main switch is open, a short-circuit bridging it over may cause damage. The testing of the individual lines of the electromagnetic circuits must be effected before closing the main switch, as, if one of the lines should be damaged, irreparable damages would be caused by closing the main switch. However when the double pole switch is open, the return branch of the individual electromagnets is interrupted. For this reason according to the present invention the lever of the double pole main switch inserted in the return circuit is bridged over by part of the series resistance. On closing the contact of the testing appliance the circuit containing the measuring instrument is thus connected with the storage battery through the whole series resistance.

To safeguard the measuring instrument against overstraining a special auxiliary contact is inserted in the circuit of the instrument, since it could be supposed that, while the main switch and one or some of the switches of the shunt circuits are closed, out of carelessness the push button for testing the circuit might be pressed. Therefore according to the present invention the auxiliary contact inserted in the circuit of the main switch is so designed that it is closed when the main switch is open, and is open when the main switch is closed. By this means the measuring instrument is protected against the main current under all circumstances.

A further characteristic feature of the present invention consists therein that the push-button switch, serving to switch in the circuit-testing appliance, is designed as a double contact in such a way that the series resistance is connected with one of the contact blocks, the measuring resistance with the second and the measuring instrument with the third contact block. Thus by pressing down the push-button at first only the series resistances and the measuring resistance are switched into the measuring circuit. Only by pressing it down further the measuring instrument itself is switched in. This subdivision of the push-button for testing the circuits serves a similar purpose as the auxiliary contact of the main switch. It serves for keeping away the ohmmeter from the main current under all circumstances. For the entire bomb-throwing appliance can be so designed that another complete switch box is provided containing main switch, the switches of the shunt circuits, lamp switch, circuit tester etc., from which separate wires lead to the bomb-releasing electromagnets. Obviously it may happen that the main switch as well as some of the group switches of the shunt branches are closed in this second switch box while they are opened in the first. Then the main current from the second switch box could get through the main lines and the measuring resistance into the measuring instrument since the auxiliary contact of the main switch in the first switch box is closed. In order to prevent this, the double push-button for circuit-testing has been inserted so that, when no testing is done, the measuring instrument is cut out under all circumstances. Thus the measuring instrument is separated from the main circuit by two contacts; the first at the main switch protecting it from too strong a current, which might arise through careless handling of the circuit-tester, the other at the double push-button protecting it from being overloaded, when no circuit-testing is done, but the different switches of both switch boxes are in an unfavorable position relatively to each other. In the drawings affixed to this specification and forming part thereof a diagram of a system of connection embodying my invention is shown.

From the storage battery $a$ the main line $c^1$ leads to the distributing arm $d$ (not shown), and from there to the electro-magnets $f^1$, $f^2$, $f^3$ . . . . . by the distribution lines $e^1$, $e^2$, $e^3$. . . . . . All electro-magnets are connected to the return circuit $c^2$ leading back to the storage battery. In the main line $c^1$, $c^2$ the double pole switch $b^1$, $b^2$ is arranged next to the battery. A series resistance $41^b$ of, to say, 150 ohm bridges over switch $b^2$ inserted in the return circuit. From the main line $c^1$ the group line 1 is branched off group switch $g$. Circuit 1 is connected by switches $s^1$, $s^2$, $s^3$ . . . . of the shunt circuits with the separate distribution lines $e^1$, $e^2$, $e^3$ . . . . . of the magnetic coils by the shunt lines $h^1$, $h^2$, $h^3$ . . . . Thus the electro-magnets can be operated either by means of the distributor or by the shunt-switches.

The appliance for testing the circuit consists of the following parts:

Intermediate the battery and the main switch a circuit 50 is branched off. It contains the series resistance $41^a$, of say, 150 ohm and is connected to contact 51 of the double push-button switch 43. The small measuring resistance 42 of about 8 ohm is permanently connected with the middle contact 52 of this switch and through line 53 with the return circuit $c^2$. The lower contact 54 of the push-button switch is connected through wire 55 with the contact spring 56, whose counter-contact spring leads to the measuring instrument 40 through wire 58. The other pole of the measuring instrument is permanently connected to the group line 1. It is a milliammeter which is however graduated for indicating the resistance so that in case of a short circuit of the line to be tested, i. e. in case of the greatest passage of current, it indicates on the dial the resistance 0, at the smallest passage the resistance ∞. The normal value of the resistance to be tested lies between these two limits and is marked in red.

If the bomb-throwing machinery is fitted with a second switch-box, this is connected with the battery $a$ through the lines 59 and 60.

Between group circuit 1 and return line $c$ the comparison resistance 44 and in series therewith the push-button 45 are inserted in such a manner, that the measuring instrument can be used at the same time for measuring the battery voltage.

The appliance acts as follows:

If it be desired to test whether the electromagnets and the group wires leading to them are damaged, the main switch $b^1$, $b^2$ and the group switch $g$ are opened and the series switches $s^1$, $s^2$, $s^3$. . . . closed selectively. If now the double push-button 43 is pressed, a weak current flows through line 50, series resistance $41^a$, contact 51, 52, the measuring resistance 42 into the return line $c^2$ and through the second series resistance $41^b$ back to the battery. By pressing the switch 43 further down contact 52, 54 and branch 55, 56, 57, 58, 40, 1, $s^1$, $h^1$, $c^2$ connected in parallel to the measuring resistance are closed through series switch $s^1$. The hand of the instrument now indicates the resistance of the branch circuit containing the electro-magnet coil $f^1$. If the coil has normal resistance, the hand covers the red mark of the scale. If the resistance is insufficient, i. e. if there is a short-circuit, then the hand deflects further, which is expressed by a figure denoting smaller resistance in the scale. Thus it is shown that the branch circuit of the magnetic coil 1 is short-circuited in some place. By opening the group switch $s^1$ and closing the next group switch $s^2$ while the push-button 43 remains pressed down, the line of magnet coil $f^2$ is tested etc. until all electro-magnet circuits have been tested. I wish it to be understood that I do not desire to be limited to the exact details of construction shown and described, for obvious modifications will occur to a person skilled in the art.

I claim:

1. In a testing device of the kind described in combination, a circuit of high resistance, a small measuring resistance and a measuring instrument adapted to be connected in parallel to said measuring resistance and in series to a line to be tested and a main switch and means allowing said measuring instrument to be inserted in said circuit of high resistance only when said main switch is open and the circuit comprising said measuring resistance closed.

2. In a testing device of the kind described in combination, a circuit of high resistance, a small measuring resistance and a measuring instrument adapted to be connected in parallel to said measuring resistance and in series to a line to be tested and a double pole main switch and means allowing said measuring instrument to be inserted in said circuit of high resistance only when said main switch is open and the circuit comprising said measuring resistance closed, that half of said double-pole main switch which is inserted in the return branch of the main circuit, being bridged over by a considerable part of said high resistance.

3. In a testing device of the kind described in combination, a circuit of high resistance, a small measuring resistance and a measuring instrument adapted to be connected in parallel to said measuring resistance and in series to a line to be tested, a double pole main switch and means allowing said measuring instrument to be inserted in said circuit of high resistance only when said main switch is open and the circuit comprising said measuring resistance closed and a contact inserted in the measuring instrument circuit and adapted to be operated by said main switch in such wise as to be open, when said switch is closed, and vice versa.

4. In a testing device of the kind described in combination, a circuit of high resistance, a small measuring resistance and a measuring instrument adapted to be connected in parallel to said measuring resistance and in series to a line to be tested, a double pole main switch and means allowing said measuring instrument to be inserted in said circuit of high resistance only when said main switch is open and the circuit comprising said measuring resistance closed and a double push button adapted to first close the measuring resistance circuit and only thereafter to cause said measuring instrument to be connected in parallel to said resistance.

In testimony whereof I affix my signature.

OSCAR WILCKE.